April 21, 1931. M. S. WOLFE 1,801,405
VEHICLE
Filed Nov. 18, 1929 4 Sheets-Sheet 3

Inventor
MAURICE S. WOLFE,
by Tautman & Tautman
Attorneys

April 21, 1931.  M. S. WOLFE  1,801,405
VEHICLE
Filed Nov. 18, 1929   4 Sheets-Sheet 4
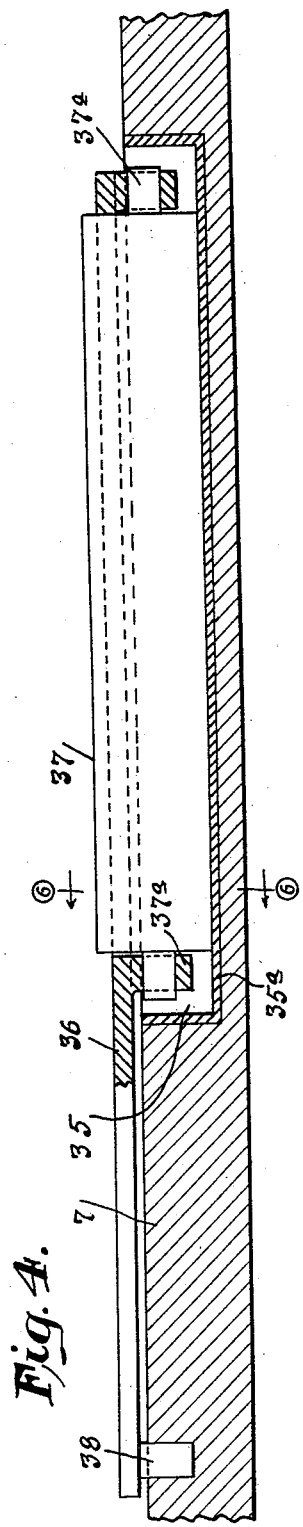
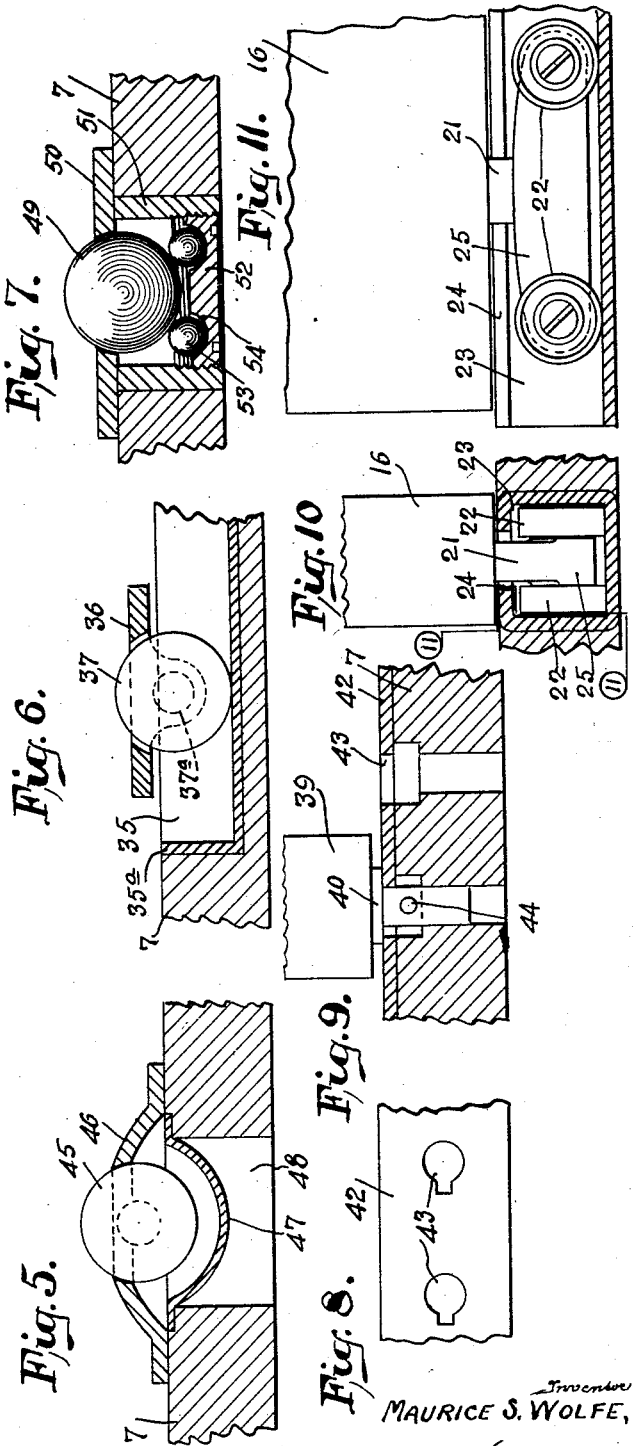
Inventor
MAURICE S. WOLFE,
Attorneys Patented Apr. 21, 1931

1,801,405

UNITED STATES PATENT OFFICE

MAURICE S. WOLFE, OF PIQUA, OHIO

VEHICLE

Application filed November 18, 1929. Serial No. 407,883.

My invention relates to vehicles and particularly to vehicles for conveying caskets, cots for invalids and the like where it is essential that the vehicle be placed parallel with the curb while being loaded and unloaded and a relatively long body such as a casket or cot be inserted through the side of the vehicle.

It is a particular object to provide means for facilitating the entry through the side of the vehicle of the casket by providing means for readily guiding and supporting it on the floor of the vehicle with certain manual direction and assistance.

It is a further object to provide a system of rollers and ball bearings on the floor of the vehicle which will be interposed between the vehicle and the casket to facilitate the movement of the casket over the floor of the vehicle on which it can be readily guided manually by reason of such rollers and balls.

It is a further object to provide a vehicle having a driving compartment and a casket-containing compartment which will be completely separated one from the other but arranged to communicate.

It is a further object to provide partitions between such compartments so that they may be partially telescoped to facilitate the entry of the casket into the casket compartment while permitting it during the entry period to pass through the driving compartment to a greater or lesser degree.

It is a further object to provide the combination of a casket compartment door, a driving compartment door and movable partitions separating the compartments which also serve as abutments for the doors so that the compartments may be thrown together when the partitions are telescoped and when both doors are opened a very large area is present for the introduction of the casket.

It is a further object to provide moving casket supporting rollers which rotate on their own axes and move about a remote axis so that they not only roll beneath the casket but move in a predetermined path as they roll thereby not only facilitating the forward movement of the casket but moving with it in a path that will facilitate the casket entry into the vehicle.

Referring to the drawings:—

Figure 4 is a section on the line 4—4 of Figure 3.

Figure 5 is a section on the line 5—5 of Figure 3.

Figure 6 is a section on the line 6—6 of Figure 4.

Figure 7 is a section on the line 7—7 of Figure 3.

Figure 8 is a detail plan view of a roller retainer plate.

Figure 9 is a section on the line 9—9 of Figure 3.

Figure 10 is a section on the line 10—10 of Figure 3 showing the roller support for the slide, telescoping partition between the driving compartment and the casket compartment.

Figure 11 is a section on the line 11—11 of Figure 10.

Figure 1:
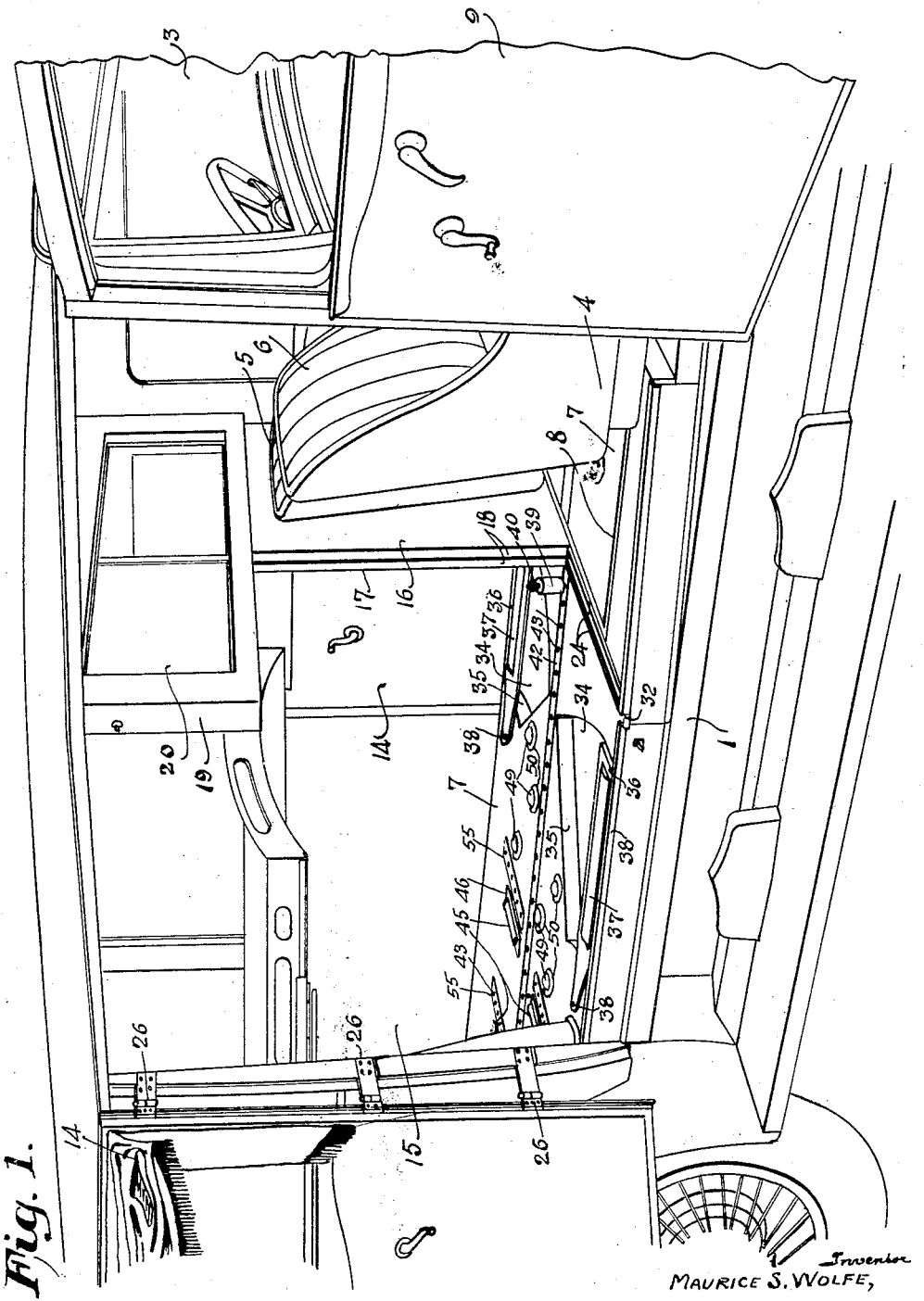
Figure 1 is a side elevation with both the driving compartment door and the casket compartment door open and the intervening partition telescoped so that the parts are in position for reception of a casket.
Figure 2:
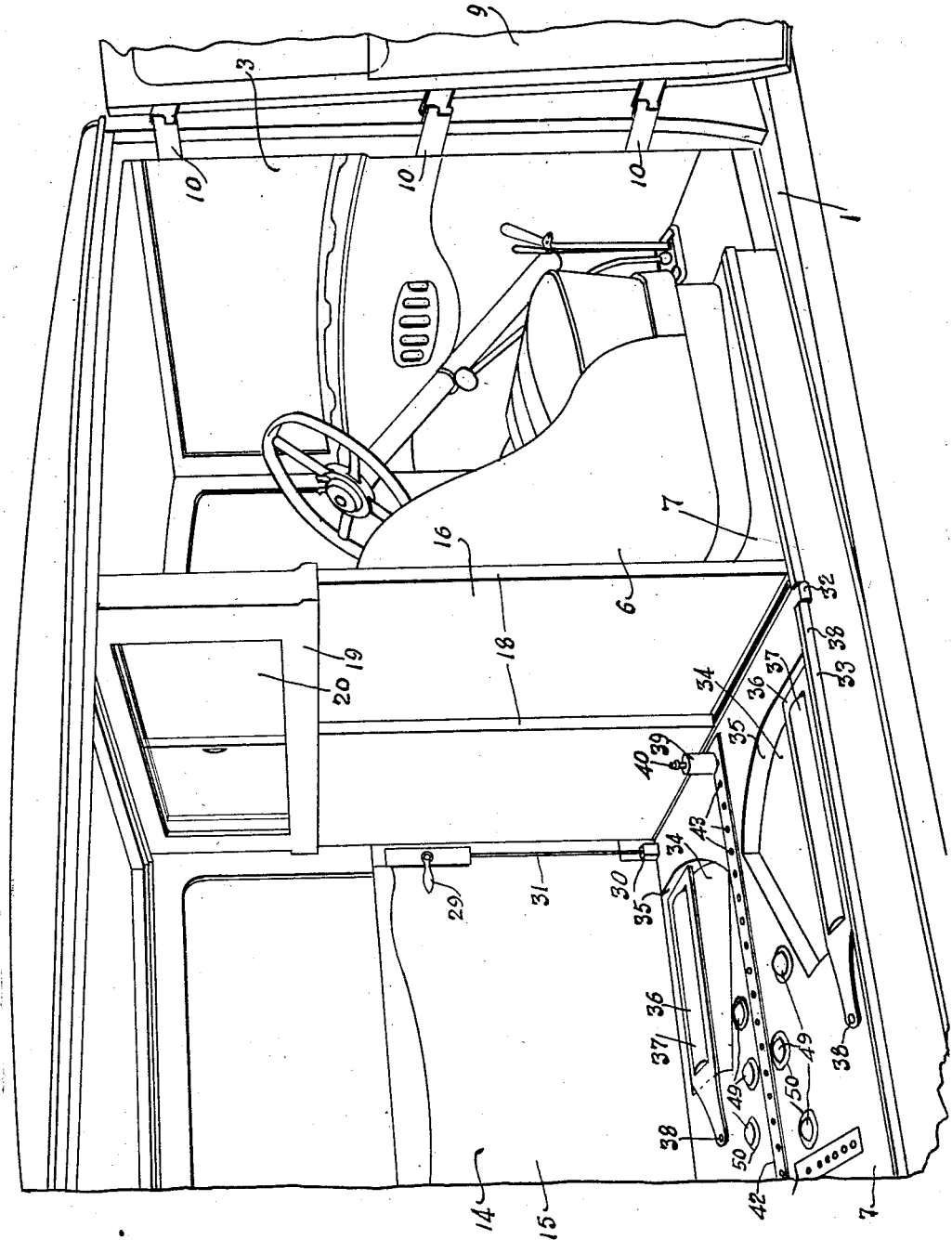
Figure 2 is a similar view looking forwardly with the partition in its normal position before it is telescoped.
Figure 3:
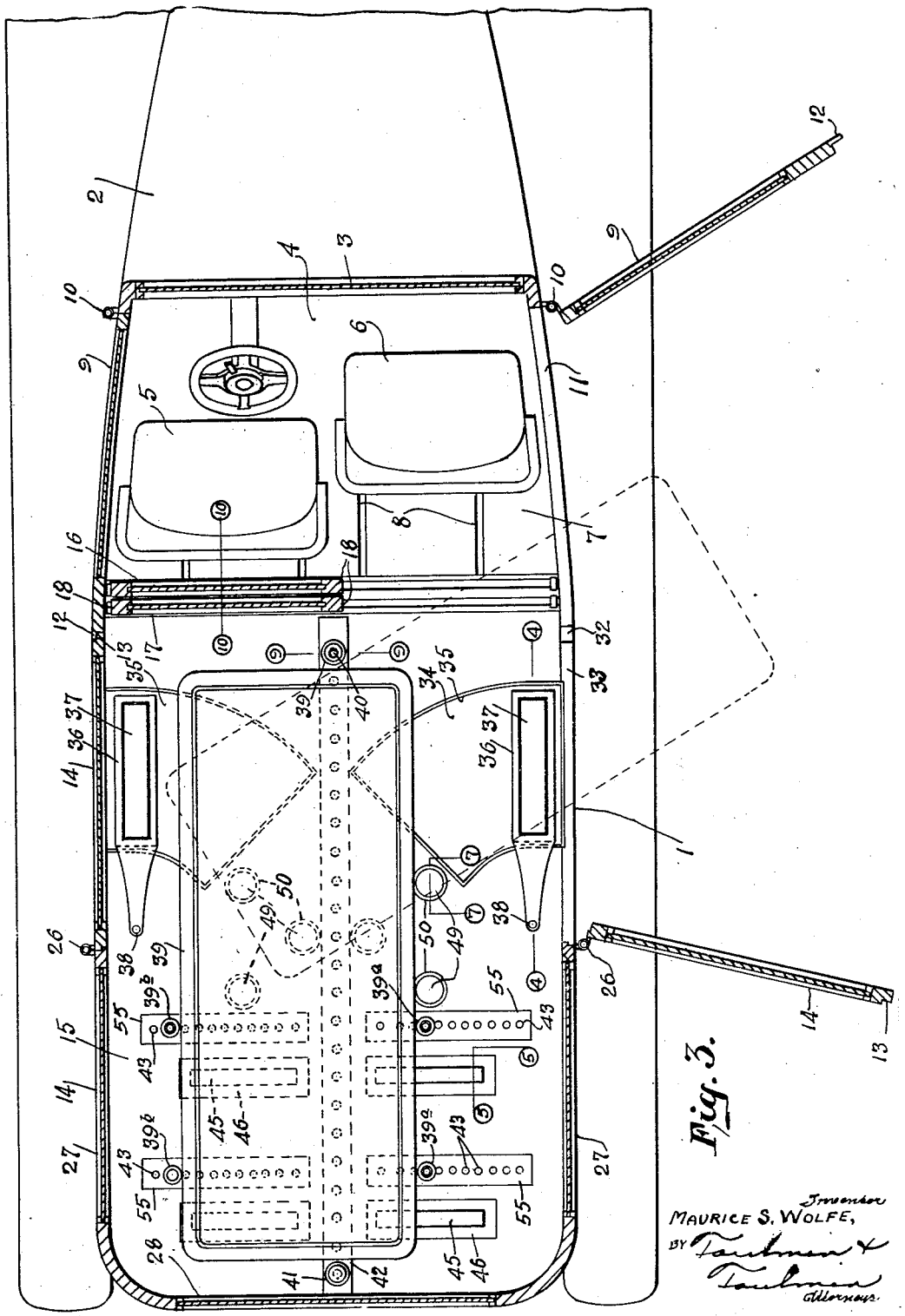
Figure 3 is a top plan view of the vehicle in position showing in dotted line how it is directed into its final position in the vehicle and with the partitions, doors and body walls in section.

Referring to the drawings in detail, 1 represents the chassis of a vehicle which is provided with the usual end 2 over the engine, the windshield 3 forming the forward end of the body and enclosing the forward end of the driving compartment 4. The seats 5 and 6 are so mounted in the driving compartment on the floor 7 that they are slidable fore-and-aft in the grooves 8 in the floor 7. This facilitates the movement of these seats forwardly when the partitions between the driving compartment and the casket compartment are telescoped as in Figure 1 and in Figure 3 so as to permit the entry of the casket into the casket compartment. The sides of the driving compartment are formed by the swinging doors 9 that are hinged at 10 to close the openings 11. The hinges are forwardly located adjacent the windshield 3 so that the doors when they swing open swing backwardly against the end of the vehicle and provide a full and free clearance through the opening 11. The door 9 is provided with a rearwardly disposed, vertical overlapping strip 12 which overlaps a corresponding recess 13 in the margin of the casket compartment door 14.

The driving compartment 4 is separate from the casket compartment designated 15 by sliding telescoping partitions which are designated respectively 16 and 17. The ends of these partitions as at 18 are located adjacent the free edges of the doors 9 and 14 when they are closed. These partitions slide along their top edges within grooves formed in the transverse, stationary partition 19 which has the glass 20.

The lower edges of these partitions 16 and 17 are provided with casters 21 having a pair of rollers 22 traveling within the track 23. The caster shaft 21 which is connected to the partition moves through a slot 24 in the track 23, the track being arranged to completely enclose the caster save for this slot. The rollers 22 are carried on the caster shaft 21 by the laterally extending members 25. The tracks 23 and grooves 24 for the respective sliding partitions 16 and 17 are arranged side by side transversely of the vehicle. When one of these partitions is moved back in the overlapping or telescoping position space is provided beneath the stationary partition 19 for the insertion of the casket as shown in dotted lines in Figure 3.

The casket compartment 15 is formed by the doors 14 which are hinged at 26 toward the rear of the vehicle and the side walls 27 as well as the rear wall 28. The walls 27 and 28 are stationary and are provided with suitable windows if desired.

The door 14 is located in position by the locking handle 29 and locking member 30 which is connected to the handle by the rod 31. The locking member 30 passes through the slot 32 formed in the rail 33 on the floor of the vehicle. The floor of the casket compartment is a continuation of the floor 7 of the driving compartment and bears the same numerical designation. This floor is sufficiently thick to contain various rollers and balls for facilitating the entry of the casket into the vehicle. The sub-floor 34 of the vehicle serves as a support for the floor 7.

In the floor 7 I have cut arcuate passageways 35 in which travel swinging roller frames 36 carrying rollers 37. These frames are pivoted at 38 on the floor 7. The frames 36 are arranged to travel in an arcuate path that is similar to the path which the casket 39 will travel in as its end is inserted through the side of the vehicle and its body is swung so that eventually the casket will occupy a position in which its major axes is parallel to the axes of the vehicle, as shown in the full line of the Figure 3. The entry position is shown in dotted line in the same figure. A section through this roller 37 shows how it is mounted in the frame 36 and how it is adapted to travel within the slot 35 which has a reenforcing line 35a. Thus the roller 37 turns on its own axis on the bearing 37a and moves bodily through the arcuate slot 35 thus furnishing a rolling support and a guide for the casket although the primary guiding of the casket is done manually.

In addition to the foregoing a buffer roller 39 is positioned vertically on the spindle 40 which is mounted in the floor 7 at the forward end of the casket compartment 15 and adjacent the juncture of the sliding partitions. This roller forms the forward rolling stop for the side of the casket as will be seen in Figure 3 where the casket is indicated in dotted lines where it would engage with the roller 39. This roller also acts as a forward stop for the casket when it is in final position in the casket compartment 15. A similar rear roller is indicated at 41 to form a rear stop. Joining these two rollers is a metal strip 42 having a plurality of key slots 43 which are adapted to receive cross pins 44 on the shaft 40 of the roller 39 so that such rollers may be locked in any position along the strip 42.

Transversely disposed rollers 45 carried in frames 46 in the floor 7 are likewise provided. These rollers are shown in section with their cages and housings in Figure 5. A guard 47 is provided beneath the roller 45 such guard projecting into a slot 48 in the floor 7.

Relatively large balls 49 are carried in the floor 7 beneath cut-away plates 50 within cages composed of side walls 51 the bottoms of which are formed by a threaded plug 52 which carries balls 53 in arcuate cut-away portions 54 for the support of the main projecting ball 49 so that the ball bearing support in the main ball 49 is thus provided to facilitate the free movement of the casket.

Transverse plates 55 are located at intervals on the floor 7 which have similar key slots 43 for positioning rollers 39a and 39b to prevent the lateral movement of the casket after it is once in position.

I have thus provided a vehicle in which a major portion of its side wall may be open, the lower half of its partition between its driving compartment and the casket compartment may be moved into telescopic or overlapping position so that the casket can move through both the driving compartment and the casket compartment and I have provided sliding seats which may be moved into inoperative position to facilitate this swinging movement of the casket through the driving compartment.

In addition to the foregoing I have provided supporting rollers some of which turn on their own axes only but are otherwise stationary; and other of which are not only turned on their own axes but move bodily in predetermined paths to facilitate the guiding of the casket. I have provided a series of vertical guides that are vertically disposed and act as stops for the casket, and in addition I have provided a plurality of ball bearing balls in the floor of the casket compartment.

I have eliminated all positive connection such as has been heretofore employed between the casket and the floor of the vehicle for guiding it. I rely primarily on manual guidance so that varying sizes of caskets can be readily accommodated which is not the case when grooves and other paraphernalia are employed for positively determining the path of the casket with respect to the vehicle floor.

It will be understood that I desire to comprehend within my invention such modifications as may be clearly embraced within the scope of my claims and invention.

It will be further understood that by casket I refer to any similar type of load for the vehicle, such as a cot, invalid chair and the like.

Having thus fully described my invention, what I claim as new and desire to secure by Letters Patent, is:

1. In a funeral car, a platform for receiving a casket, arcuate slots in said platform, frames adapted to swing in said slots pivoted in said platform and rollers carried in said frames adapted to turn on their own axes and to move within the frames in the slots.

2. In a funeral car, a casket receiving floor, transversely arranged, spaced rollers projecting through said floor located in the rear half of the floor, balls projecting through the floor at spaced points in the forward half of the floor, vertically disposed rollers fore-and-aft in the floor, laterally disposed rollers on either side of the floor, means for detachably mounting and positioning said vertically disposed roller, supplementary rollers adjacent the entrance to the floor and means for swinging said rollers from the side of the floor adjacent the entrance thereto and parallel with the entrance to a point toward the center of the floor at an angle to the entrance.

3. In a funeral car, a casket receiving floor, a body enclosing said floor, a door adapted to open in said body for receiving said casket, a roller mounted parallel to the opening in the body for the insertion of the casket, means for moving said roller bodily in an arcuate path to a point where its major axis is at an angle to the door opening, said floor having an arcuate slot for receiving said roller and a frame pivoted on said floor for carrying the roller within said slot while permitting it to turn on its own axis.

In testimony whereof, I affix my signature.

MAURICE S. WOLFE.